April 25, 1950 L. G. KRUG 2,505,189
SEAL
Filed Dec. 4, 1944
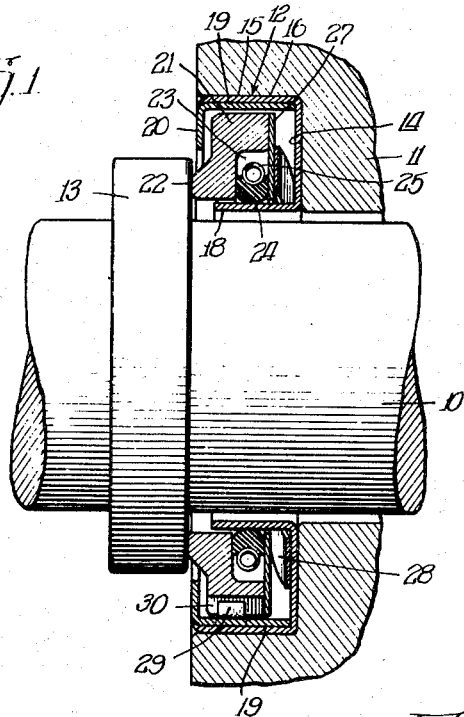
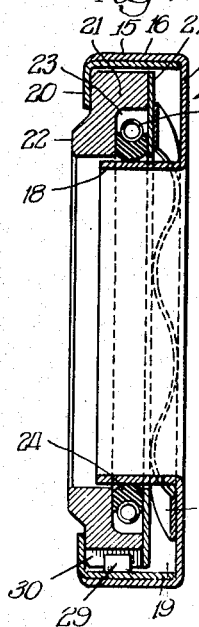
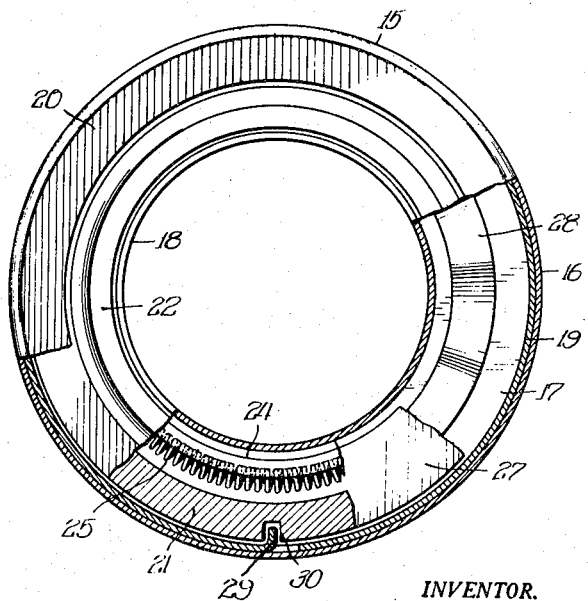
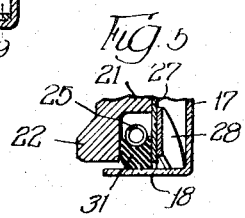
INVENTOR.
Louis G. Krug,
BY
Cromwell, Greist & Warden Patented Apr. 25, 1950

2,505,189

UNITED STATES PATENT OFFICE 2,505,189

SEAL

Louis G. Krug, Chicago, Ill., assignor to Chicago Rawhide Manufacturing Company, Chicago, Ill., a corporation of Illinois Application December 4, 1944, Serial No. 566,477

5 Claims. (Cl. 286—11.14)

The present invention is concerned with an end thrust seal adapted for coaction with a pair of coaxial, relatively rotatable members to seal the space therebetween against loss or seepage of oil, grease or other liquid, and to prevent infiltration of dirt or other foreign matter.

It is an object of the invention to provide a seal of the type described which is self-contained, which functions very effectively for the above mentioned purpose, and, moreover, which is very inexpensively manufactured and assembled.

It is a further object of the invention to provide a seal of the type described including an internal sealing element and improved means for restrainedly mounting the same in the self-contained seal, whereby the functioning of the sealing element is improved and its effective life lengthened.

In the drawings,

Fig. 1 is a fragmentary side elevational view, partially in longitudinal vertical section, illustrating the seal of the invention applied to a pair of coaxial, relatively rotatable members;

Fig. 2 is a view in section generally similar to that of Fig. 1, illustrating the seal per se prior to its application to the members;

Fig. 3 is a view partially broken away and in transverse vertical section, further illustrating details of the seal construction;

Fig. 4 is an elevational view partially broken away and in longitudinal vertical section, illustrating the form and construction of the resilient compressible sealing element or band which constitutes a component of the seal; and Fig. 5 is a fragmentary view in section corresponding to Fig. 2, illustrating a somewhat modified embodiment.

Referring particularly to the drawings, the reference numerals 10, 11, respectively designate a pair of coaxial, relatively rotatable members, for example, a shaft and housing, for application to which the seal of this invention, generally designated 12, is intended. So applied, the seal functions to prevent loss of oil, grease or other fluid from the interior of the housing, or to prevent the admission of dirt or other foreign matter thereinto. It will, of course, be understood that the invention is not at all restricted by the particular nature of the relatively rotatable members and that the seal has utility wherever it is desired to seal off communication between two coaxial relatively rotatable parts. The reference numeral 13 designates a radial rib or other sealing surface provided on the shaft 10, with a lateral sealing face of which the seal coacts to the above described ends.

The seal 12 is suitably fixedly secured on the housing 11, as by a press-fit in a recess 14 in the latter concentric with the shaft, as illustrated in Fig. 1. The seal includes an annular, generally U-sectioned casing 15 in the embodiment illustrated, said casing being made up of an outer axially extending member 16, an annular radial connecting wall 17 and a reentrant inner member or flange 18 concentric with member 16. An annular cup-like retaining member 19 is telescoped within the member 15, being held in such relation to the member 15 by spinning or crimping the free edge of outer member 16 over onto the retaining member.

A sealing ring 21 of carbon or other appropriate sealing material is disposed interiorly of the casing 15 constituted by the above structure and is restrained from axial movement therein by means of retaining lip 20. It will be observed that sealing ring 21 is provided with an annular bearing member or surface 22 which projects outwardly of said retaining flange in the completed seal shown in Fig. 2, or in the operative mounted position of the same illustrated in Fig. 1. Bearing member 22 engages the sealing surface on the shaft rib 13 to constitute a running seal at that point.

It will also be observed that the sealing ring 21 is-in at least partially telescoped relation over the inner, axially extending member or reentrant flange 18 of the casing 15. The inner periphery of this ring is rabbeted on the edge remote from bearing member 22 to provide an inner annular recess 23 radially opposed to said flange or member 18; and in said recess is disposed a continuous annular band 24 of an appropriate, resiliently compressible sealing material. Band 24 is of smaller normal circumference than, and has sealing engagement with, the outer surface of member 18 and is urged further for said engagement by a continuous annular tension spring 25 surrounding the same. To this end the band 24 is made crescent-like in section, as clearly illustrated in Fig. 4, having an outer groove 26 for the nesting reception of the spring. The inner periphery of the band is arcuate, preferably in the shape of a segment of a circle to produce a high unit pressure.

The band 24 is maintained in recess 23 under considerable lateral compression by means of an annular closure washer 27 coacting with the side of the ring 21 remote from bearing member 22. The washer is urged for this engagement by means of an undulated spring 28 backing against the radial wall 17 of the casing. In the seal as shown in Fig. 2 this spring thrusts the ring outwardly against retaining lip 20, but is yieldable sufficiently to permit some inward movement of the ring in operative assembled condition of the seal, as in Fig. 1. The spring also causes the washer to compress the resilient sealing band considerably, whereby axial shifting of the band in the internal groove defined constituted by coacting ring and washer is effectively prevented; moreover, said axial compression increases or stores up the resilient energy in the band to augment its inherent radial constrictive sealing action on the sealing surface of the inner casing member 18. However, the axial engagement of washer 27 against the rear surface of ring 21 positively limits the degree of axial compression of the band 24; further, said axial compression is never of sufficient intensity to prevent or inhibit the radial constrictive action of the band. In other words, said band is never engaged with such force on its sides as to cause the same to "freeze" and thereby detract from its radial sealing action.

In operation, particularly at high speeds of rotation, the ring 21 tends to rotate relative to the associated seal elements. In order to prevent such rotation, I provide a struck-in lug or finger 29 in the retaining member 19, which engages in a recess 30 in the ring.

From the foregoing it will be appreciated that I provide a combination including an annular band of resilient sealing material which acts radially against a sealing surface and which has the radial action thereof augmented first by an annular garter spring member, and secondly by axial compression up to a predetermined degree determined by the engagement of the washer with the ring; and that said washer and ring coact to constitute and define a composite annular groove housing the band and garter spring member, the composite character of the housing contributing to the results noted above and insuring a long effective life of the sealing band 24.

In the use of certain types of synthetic or artificial rubber materials for the fabrication of band 24, for example, neoprene, which materials have a tendency to swell in section or "grow" when exposed to hydrocarbons or other fluids, the yieldable nature of washer 27 accommodates said "growing." It renders the seal self-compensating and does not permit the building up of an axial pressure on the band such as would tend to prevent or objectionably inhibit its radial action. Still further, it is obvious from inspection of the seal that the composite character of the coacting ring and washer lends great simplicity of manufacture and assembly to the seal as a whole.

In Fig. 5 I illustrate a slightly modified embodiment of the invention, wherein the sealing band, designated 31, has the concave outer periphery nestingly receiving the garter spring 25, but in which the inner periphery is square at the edge thereof which may be exposed to fluid pressure. This outline of the band has advantages over the convex nose section in certain instances wherein fluids under pressure are handled and I therefore specifically desire the same to be regarded as coming within the scope of the invention. In all other respects the seal structure is similar to that previously described.

What I claim is:

1. A self-contained rotary end thrust seal for a pair of coaxial, relatively movable members, comprising a hollow annular casing adapted to be associated in fixed relation to one of said members, a sealing ring concentrically disposed in the casing and axially restrained thereby, having a sealing element for sealing engagement with the other member, a sealing surface coaxial with said casing in fixed relation thereto, said ring having an annular recess in a peripheral edge thereof, which recess is in radially opposed relation to said sealing surface, a continuous annular band of resiliently compressible material of generally crescent-shaped outline disposed in said recess with the convex surface thereof in sealing engagement with said first named member, a continuous coil spring disposed against the concave surface of said band to maintain said last named engagement, a closure washer coacting with said ring and the recess therein in defining a laterally closed annular groove receiving the band and spring, and restraining movement of the band axially in said groove, and means to maintain the washer in operative position against the ring.

2. In combination with annular sealing means providing an internally opening groove on the inner periphery thereof and a sealing member in telescoped relation interiorly of said sealing means adjacent said groove, an annular sealing band of resiliently compressible material disposed in said groove and having constrictive sealing engagement with said member in encircling relation to the latter, said band having an outer concave periphery, an annular spring member nested in said concave periphery to urge and maintain the band in engagement with the sealing member, and means resiliently engaging corresponding sides of said sealing band and said first named sealing means to axially compress the former while being axially limited by the latter.

3. In combination with annular sealing means providing an internally opening groove on the inner periphery thereof and a sealing member in telescoped relation interiorly of said sealing means adjacent said groove, an annular sealing band of resiliently compressible material disposed in said groove and having constrictive sealing engagement with said member in encircling relation to the latter, said band being of generally crescent-like section providing a convex inner nose engaging said member and an outer concave periphery, an annular spring member nested in said concave periphery to urge and maintain the band in engagement with the sealing member, and means resiliently engaging corresponding sides of said sealing band and said first named sealing means to axially compress the former while being axially limited by the latter.

4. A seal comprising an annular casing adapted to be secured to one of a pair of coaxial relatively rotatable parts, an axially extending surface to be sealed in said casing, an annular sealing ring in at least partially telescoped relation to said surface and provided with a sealing element facing axially in the direction of one side thereof for engagement with the other of said parts, said ring having an annular rabbet therein opening to a periphery thereof and to the side of the ring opposite said first named side thereof, a band of sealing material disposed in said rabbet in sealing engagement with said surface to be sealed, a spring in said rabbet concentrically engaging said band and urging the same radially against said surface, said rabbet being of sufficient radial depth to accommodate said spring, an annular closure member for said rabbet, said member being in telescoped relation to said surface to be sealed but freely shiftable axially therealong and out of sealing engagement therewith, said closure member being axially engageable with said band to compress the same and with the rabbeted side of said ring to limit said compression, and means yieldably urging said member axially for said engagement.

5. A self-contained seal comprising an annular casing adapted to be secured to one of a pair of coaxial, relatively rotatable parts, an axially extending surface to be sealed integral with said casing, an annular sealing ring in at least partially telescoped relation to said surface and provided with a sealing element facing axially in the direction of one side thereof for engagement with the other of said parts, said ring having an annular rabbet therein opening to a periphery thereof and to the side of the ring opposite said sealing element, a band of sealing material disposed in said rabbet in sealing engagement with said surface to be sealed, a spring in said rabbet concentrically engaging said band and urging the same radially against said surface, said rabbet being of sufficient radial depth to accommodate said spring, an annular closure member for said rabbet, said member being in telescoped relation to said surface to be sealed but freely shiftable axially therealong and out of sealing engagement therewith, said closure member being axially engageable with said band to compress the same and with the rabbeted side of said ring to limit said compression, means yieldably urging said member axially for said engagement, and means on said casing engageable with said sealing ring to restrain axial separation thereof from the casing.

LOUIS G. KRUG.

REFERENCES CITED

The following references are of record in the file of this patent:

UNITED STATES PATENTS

| Number | Name | Date |
| --- | --- | --- |
| 1,828,178 | Fox | Oct. 20, 1931 |
| 1,986,285 | Pollitz | Jan. 1, 1935 |
| 2,076,716 | Fretter | Apr. 13, 1937 |
| 2,089,773 | Vedovell et al. | Aug. 10, 1937 |
| 2,321,871 | Stevenson | June 15, 1943 |
| 2,363,110 | Krug | Nov. 21, 1944 |

FOREIGN PATENTS

| Number | Country | Date |
| --- | --- | --- |
| 348,374 | Great Britain | of 1931 |
| 300,501 | Germany | of 1917 |